(12) United States Patent
Eyhorn et al.

(10) Patent No.: US 9,697,655 B1
(45) Date of Patent: Jul. 4, 2017

(54) ENGINE FAILURE DETECTION SYSTEM

(71) Applicant: Christopher Eyhorn, Austin, TX (US)

(72) Inventors: Christopher Eyhorn, Austin, TX (US);
John Harlan, Cedar Park, TX (US);
John Morton, Austin, TX (US)

(73) Assignee: Christopher Eyhorn, Austin, TX (US)

( * ) Notice: Subject to any disclaimer, the term of this patent is extended or adjusted under 35 U.S.C. 154(b) by 0 days.

(21) Appl. No.: 15/071,455

(22) Filed: Mar. 16, 2016

(51) Int. Cl.
*G07C 5/08* (2006.01)
*G01M 15/04* (2006.01)
*G01M 15/14* (2006.01)

(52) U.S. Cl.
CPC ........... *G07C 5/0808* (2013.01); *G01M 15/14* (2013.01); *G07C 5/0825* (2013.01)

(58) Field of Classification Search
CPC .... G07C 5/0808; G07C 5/0825; G01M 15/14
See application file for complete search history.

(56) References Cited

U.S. PATENT DOCUMENTS

| | | | |
|---|---|---|---|
| 4,538,777 A | 9/1985 | Hall | |
| 4,546,353 A | 10/1985 | Stockton | |
| 4,814,764 A | 3/1989 | Middleton | |
| 4,845,617 A | 7/1989 | Kamenetz et al. | |
| 4,884,205 A * | 11/1989 | Hernandez-Diaz | G05D 1/0072 244/194 |
| 5,363,317 A * | 11/1994 | Rice | G07C 3/00 701/100 |
| 8,352,099 B1 * | 1/2013 | Eggold | B64C 15/02 244/75.1 |
| 2010/0102173 A1 | 4/2010 | Everett et al. | |

FOREIGN PATENT DOCUMENTS

EP         457541        11/1991

* cited by examiner

*Primary Examiner* — Michael J Zanelli

(74) *Attorney, Agent, or Firm* — Fish & Richardson P.C.

(57) ABSTRACT

Methods, systems, and apparatus, including computer programs encoded on a computer storage medium, for receiving signals that represent inertial forces experienced by the aircraft from an inertial sensor mounted in an aircraft. Identifying a pattern within the signals that represents a reduction of thrust on one side of the aircraft caused by an engine failure. Causing an indication within the aircraft to be activated in response to identifying the pattern, and thereby, alerting a pilot to a possible engine failure.

25 Claims, 5 Drawing Sheets

ENGINE FAILURE DETECTION SYSTEM

BACKGROUND

The failure of an engine during flight can be very hazardous situation for an aircraft. A pilot must rapidly and correctly detect, diagnose, and take actions to correct the problem by implementing a series of emergency procedures. Often, there is little room for error in such situations. While some automatic engine failure and engine feathering systems do exist, such systems are primarily reserved to high-end aircraft and rely on integrated engine system sensors monitoring equipment operation (e.g., engine parameters) to detect failures.

SUMMARY

This specification relates to systems and methods for detecting engine failure in multiengine aircraft. More specifically, the specification relates to detecting engine failure by sensing characteristic acceleration and rotation conditions.

Implementations of the present disclosure generally relate to methods and systems for detecting and alerting a pilot to the failure, or potential failure, of an engine on a multiengine aircraft. More particularly, implementations of the present disclosure are directed to detecting characteristic acceleration and rotation conditions experienced by an aircraft that correlate to the loss of an engine. Aircraft movement is sensed by inertial detectors (e.g., an accelerometer and a gyroscope). In some examples, a six-axis inertial detector is used to measure the aircraft's acceleration along its x, y, and z-axes and rotation about the x, y, and z-axes. The signals generated by the inertial detector are monitored to identify patterns that indicate the potential failure of an engine. If such a pattern is detected, warning indicators (e.g., lights) are illuminated to alert the pilot to the potential loss of an engine.

In general, innovative features of the subject matter described in this specification can be embodied in methods that include the actions of receiving signals that represent inertial forces experienced by the aircraft from an inertial sensor mounted in an aircraft. Identifying a pattern within the signals that represents a reduction of thrust on one side of the aircraft caused by an engine failure. Causing an indication within the aircraft to be activated in response to identifying the pattern, and thereby, alerting a pilot to a possible engine failure. Other implementations of this aspect include corresponding systems, apparatus, and computer programs, configured to perform the actions of the methods, encoded on computer storage devices.

In a second general aspect, innovative features of the subject matter described in this specification can be embodied in an engine failure detection system. The system includes one or more processors, a data store coupled to the one or more processors, an inertial sensor coupled to the one or more processors and configured to be mounted to an aircraft, a first warning light coupled to the one or more processors, and second warning light coupled to the one or more processors. The data store includes instructions stored thereon for execution by the one or more processors that cause the one or more processors to perform the operations of receiving signals that represent inertial forces experienced by the aircraft from an inertial sensor mounted in an aircraft. Identifying a pattern within the signals that represents a reduction of thrust on one side of the aircraft caused by an engine failure. Causing an indication within the aircraft to be activated in response to identifying the pattern, and thereby, alerting a pilot to a possible engine failure.

These and other implementations can each optionally include one or more of the following features.

In some implementations, the system can be a stand-alone system that is not integrated with other sensor or systems of the aircraft. In some implementations, the system can include a wireless communication interface, and the first warning light and the second warning light can each be coupled to a wireless receiver. Causing one of the first or second warning light to be activated can include sending a command to activate the one of the first or second warning light by the wireless communication interface to the wireless receiver of the one of the first or second warning light.

In some implementations, the inertial sensor can be a 6-axis inertial sensor, and the signals can include three linear acceleration signals, each being along a different orthogonal axis, and three angular acceleration signals, each being about a different orthogonal axis.

In some implementations, the pattern can include a change in magnitude for three of the signals that occurs, for each of the three signals, within a first time period, and a persistence in the magnitude change of two of the three signals for a duration of a second time period, after the first time period. In some implementations, the change in magnitude for each of the three signals is greater than or equal to a, respective, threshold value. In some implementations, the first time period is less than or equal to 200 ms. In some implementations, the second time period is between 1 second and 5 seconds. In some implementations, the persistence in the magnitude change of the two of the three signals is indicated by the respective magnitudes of the two signals remaining above a, respective, threshold value for the duration of the second time frame.

In some implementations, identifying the pattern includes combining three of the signals into a combined signal and determining whether the combined signal exceeds a threshold value.

In some implementations, the process includes determining on which side of the aircraft the reduction of thrust occurred based on the signals, where causing an indication within the aircraft to be activated includes causing a first indication to be activated based on determining that the reduction in thrust occurred on the port side and causing a second indication to be activate based on determining the reduction in thrust occurred on the starboard side.

In some implementations, the process includes determining, from the signals, an average gravitational acceleration signal, determining, based on the average gravitational acceleration signal, an offset between a position of a z-axis of the aircraft relative to a z-axis of the inertial sensor, and modifying the signals, based on the position of the z-axis of the aircraft relative to the z-axis of the inertial sensor, to account for the offset.

In some implementations, the process includes receiving a user input to enter a calibration mode and, in response to identifying the pattern, modifying one or more threshold values and one or more time periods based on the pattern.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but may also include any combination of the aspects and features provided.

Particular implementations of the subject matter described in this specification can be implemented so as to realize one or more of the following advantages. Implementations may include a stand-alone engine failure warning system for aircraft. Some implementations may provide an engine failure warning system that does not require intrusion into aircraft components for installation. Some implementations may provide an engine failure warning system that includes remote mounted indicators separate from a main processing unit.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
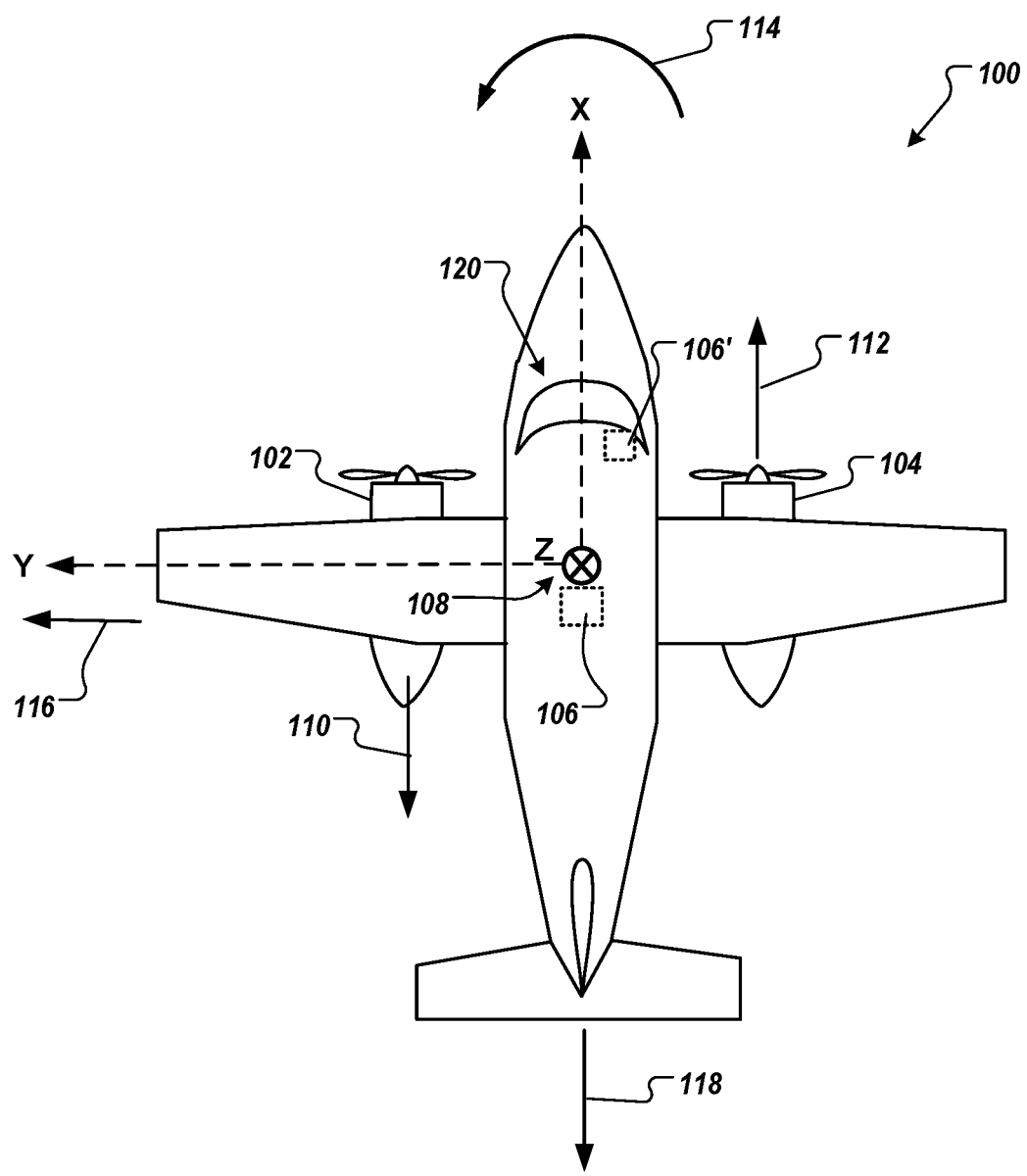
FIG. 1 depicts a top view of a multiengine aircraft.

Implementations of the present disclosure generally relate to methods and systems for detecting and alerting a pilot to the failure, or potential failure, of an engine on a multiengine aircraft. More particularly, implementations of the present disclosure are directed to detecting characteristic acceleration and rotation conditions experienced by an aircraft that correlate to the loss of an engine. Aircraft movement is sensed by inertial detectors (e.g., an accelerometer and a gyroscope). In some examples, a six-axis inertial detector is used to measure the aircraft's acceleration along its x, y, and z-axes and rotation about the x, y, and z-axes. The signals generated by the inertial detector are monitored to identify patterns that indicate the potential failure of an engine. If such a pattern is detected, warning indicators (e.g., lights) are illuminated to alert the pilot to the potential loss of an engine.

Some implementations of the present disclosure can also identify on which side of the aircraft a failed engine is located based on the inertial detector's measurements of aircraft acceleration and rotation. The warning indicators, in such implementations, can be activated in such a way as to inform the pilot on which side of the aircraft the failed engine is located. For example, in some implementations, the warning indicators can be placed on respective left and right engine controls. If the failure of a right-side engine is detected, the right-side warning indicator can be activated to flash red while a left-side warning indicator can be activated to flash green. Such a configuration may aid the pilot in performing aircraft emergency procedures. For instance, a flashing red light on the right engine control may provide an immediate indication to feather a right-side engine. In similar manner, the flashing green light on the left engine control may provide an immediate indication to increase power to the left-side engine(s).

The term "acceleration" is used herein in its general sense as a time rate of change in velocity and includes such a change in either a positive or negative direction. Acceleration in a negative direction (relative to a defined coordinate system shown in FIG. 1) can be described as either "deceleration" or "negative acceleration." The term "deceleration" is generally used to describe acceleration in the negative "x" direction, and "negative acceleration" is generally used to describe acceleration in the negative "y" direction (e.g., an acceleration in the direction of the left or port side of an aircraft).

The terms "right-side" and "left-side" engine(s), as used herein, refer to engine(s) located on the right or left side of an aircraft, respectively, from the reference of a pilot in the cockpit facing towards the nose of the aircraft.

The term "approximately," as used herein, indicates values that are within acceptable error ranges within the art and/or equipment operating tolerances of devices or circuits used to implement a particular process and in a particular environment. For example, if a particular device has a +/−10 mV error an "approximate" value would take into account such error. Similarly, if the device is operating in a high noise environment the error may increases in accordance with the noise.

FIG. 1 depicts a top view of a multiengine aircraft 100. The aircraft 100 includes one or more left-side engines 102 and one or more right-side engines 104. In addition, the aircraft 100 includes an engine failure detection system (EFDS) 106. The EFDS 106 is configured to detect and alert a pilot to the failure of one or more engines on either side of the aircraft. The EFDS 106 can detect an engine failure based on characteristic acceleration and rotation characteristics that are indicative of an engine failure. The most pronounced of such characteristics may occur when all engines fail on one side of an aircraft (e.g., one left-side engine on a twin engine aircraft, or two left-side engines on a four-engine aircraft).

When an engine fails on an aircraft 100, the aircraft 100 experiences characteristic acceleration and rotation in several directions with respect to a central axis 108 of the aircraft. The central axis 108 is depicted as an orthogonal x, y, z axes. The positive x-axis is oriented towards the front of the aircraft 100. The positive y-axis is oriented towards the left-side of the aircraft 100. And, the positive z-axis is oriented vertically downwards towards the bottom of the aircraft (into the page of FIG. 1).

For example, if the left-side engine 102 failed on a twin engine aircraft 100 the failed engine would cause extra drag on the left side of the aircraft 100 (indicated by arrow 110), while the operating engine (e.g., the right-side engine 104) continues to provide forward thrust (indicated by arrow 112). In general, the drag and thrust provided by the failed and operating engines, respectively, may cause the aircraft to experience motion in at least three directions. The aircraft 100 will tend to rotate (or yaw) about the z-axis (indicated by arrow 114). This rotation or yaw can be detected by a gyroscopic sensor of the EFDS 106. The aircraft 100 will tend to accelerate in the direction of the positive y-axis (indicated by arrow 116). The y-axis acceleration can be detected by an accelerometer (e.g., a y-axis oriented accelerometer channel) of the EFDS 106. And, the aircraft 100 will tend to decelerate along the x-axis (indicated by arrow 118). The x-axis acceleration can be detected by an accelerometer (e.g., an x-axis oriented accelerometer channel) of the EFDS 106. The motion of the aircraft 100 would be similar for the failure of the right-side engine, but with the direction of each motion (except the x-axis deceleration) reversed.

The EFDS 106 can monitor the inertial detector signals for appropriate patterns that indicate one or more of the above described motions to identify an engine failure, and, as appropriate, activate warning indicators to alert the pilot. While detecting the appropriate patterns in one signal may be sufficient to detect an engine failure, in some implementations, appropriate patterns must be detected in two or all three of the signals to positively indicate an engine failure and avoid excessive false positive indications. By detecting engine failure based on the motion characteristics of an aircraft 100, it is not necessary to intrude into the aircraft's 100 flight control or avionics systems to install the EFDS 106, which can be expensive, time consuming, and trigger Federal Aviation Administration (FAA) regulations. In other words, the EFDS 106 can be configured as a standalone system, in some implementations.

Furthermore, the EFDS 106 can include several different configurations depending, for example, on the particular aircraft in which it is installed or the manner of installation. In some implementations, the EFDS 106' is configured to be installed in the cockpit 120 of an aircraft 100. For example, the EFDS 106 can be integrated into the engine controls. In some implementations, the EFDS 106 can configured to be installed in one location (e.g., at or near a central axis 108 of an aircraft 100) with warning indicators configured to be installed in another location (e.g., in the cockpit). For example, EFDS 106 sensors can be installed at the central axis 108 and configured to communicate, by either wired or wireless communications, with warning indicators installed in the cockpit 120 of the aircraft 100.

Figure 2:
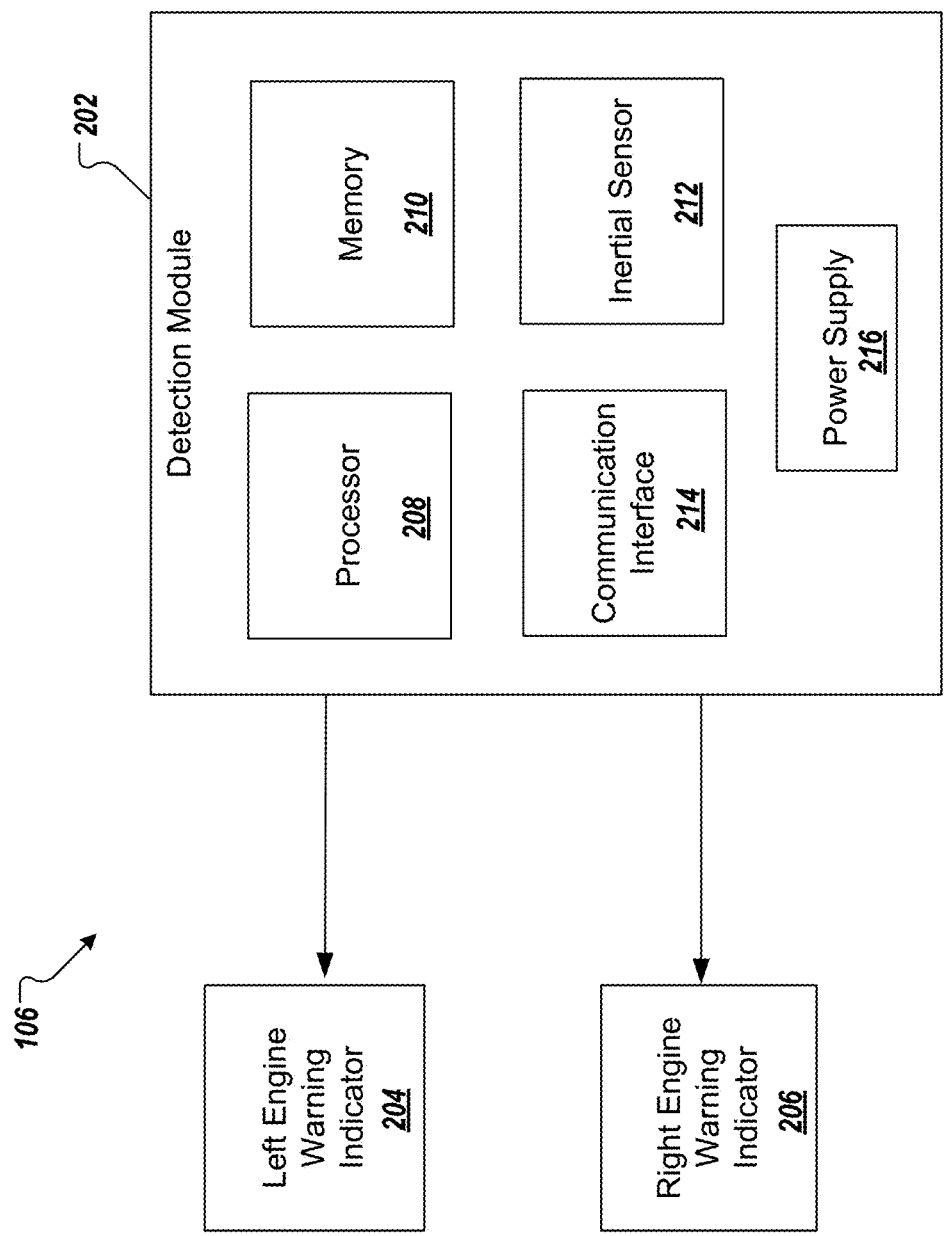
FIG. 2 depicts a block diagram of an example engine failure detection system in accordance with implementations of the present disclosure.

FIG. 2 depicts a block diagram of an example EFDS 106 in accordance with implementations of the present disclosure. The EFDS 106 includes a detection module 202 and warning indicators 204, 206, for example, a left engine warning indicator 204 and a right engine warning indicator 206. The detection module 202 includes a processor 208, computer-readable memory 210, inertial sensor 212, a communication interface 214, and a power supply 216.

The processor 208 is configured to execute instructions stored by the computer-readable memory 210. The processor 208 receives and monitors inertial data signals from the inertial sensors 212 to detect engine failures, as described in more detail below, and upon detecting an engine failure activates appropriate functions of the warning indicators 204, 206. In some examples, the processor 208 communicates commands to the warning indicators 204, 206 through a communication interface 214. The processor 208 can include one or more computer processors including, but not limited to a central processor, microcontrollers, digital signal processors (DSP), application specific integrated circuits (ASIC), or field programmable logic arrays (FPGA).

The inertial sensor 212 includes electronic accelerometers and gyroscopic sensors to sense an aircraft's acceleration and rotational motion along and about one or more axes. For example, the inertial sensor 212 can be a 6-axis MEMS (micro-electro-mechanical system) based inertial sensor. For example, the inertial sensor 212 can detect and generate electronic signals that represent the aircraft's acceleration along three orthogonal axes (x-y-z axes) and rotation about the same three axes.

In some examples, the processor 208 communicates commands to the warning indicators 204, 206 through a communication interface 214. The communication interface 214 can include, for example, a low-power computer network communication interface (e.g., a Bluetooth low energy (BLE) interface) or a hardwired communication interface (e.g., universal serial bus (USB) interface). The electronic communications interface 214 can be configured to communicate data signals to the corresponding communication interfaces and warning indication driver circuits of the warning indicators 204, 206. The data signals can include, for example, warning activation signals to initiate different appropriate warning functions of the warning indicators 204, 206.

The power supply 216 provides power to the EFDS 106. The power supply 216 can be a self-contained power supply (e.g., a battery) or a connection to an external power supply (e.g., a power converter and connection cable). In some implementations, the detection module 202 and each warning indicator 204, 206 can each include separate power supplies 216.

The warning indicators 204, 206 are controlled by the detection module 202. The warning indicators 204, 206 can include visible or audible warning devices. For example, the warning indicators 204, 206 can include multiple colored lights (e.g., green and red LEDs), alarms or buzzers to alert a pilot to an engine failure. In some examples, the warning indicators 204, 206 can be integrated into the detection module 202 (e.g., contained within one housing). In some examples, the warning indicators 204, 206 can be separate devices from the detection module 202. In such implementations, the warning indicators 204, 206 can include individual power supplies and driver circuits for operating the visible and audible warning devices. In addition, the warning indicators 204, 206 can include individual wired or wireless communication interfaces for receiving instructions from the detection module 202. In some implementations, the warning indicators 204, 206 can include housings that are configured to be attached to the aircraft's engine controls.

In some implementations, the detection module 202 is configured to be installed near the central axis of an aircraft in order to obtain accurate measurements of the aircraft's acceleration and rotation. In some implementations, the detection module 202 can be configured to be installed anywhere in an aircraft. In such implementations, the detection module 202 can be configured to perform a coordinate system transformation. For example, the detection module 202 can be configured to detect an average gravitational signal from the inertial data signals received from the inertial sensor 212. More specifically, because the gravitational force is constant, the acceleration due to gravity will be a constant acceleration within the combined acceleration signals received from the inertial sensor 212 apart from the motion of the aircraft. Furthermore, the gravitational force vector, on average, passes vertically through an aircraft, so this vector can be used to approximate the vertical, or z-axis, of the aircraft. Once the average gravitational signal is determined, the detection module 202 can determine an offset between the orientation of the average gravitational signal as compared to the orientation of the detection module's 202 z-axis, or more precisely, the inertial sensor 212's z-axis. The detection module 202 can use the offset to modify the inertial data signals so as to correct for errors in the signals caused by any orientation offset between the z-axis of the aircraft and that of the detection device 202.

In some implementations, the EFDS 106 can be configured to activate the warning indicators 204, 206 in a sequence in which the pilot should adjust the engine controls to correct for the loss of an engine. In other words, the EFDS 106 can be configured to guide a pilot through emergency procedures for responding to the failure of an engine. For example, if a right-side engine is lost, the EFDS 106 can activate a red light on a warning indicator 206 on the right engine control to indicate that the pilot should feather that engine. Subsequently, the EFDS 106 can activate a green light on a warning indicator 204 on the left engine control to indicate that the pilot should increase the thrust of that engine. In some examples, the EFDS can detect inertial changes in the aircraft characteristic of a pilot feathering one engine and, in response, activate the green light. For example, the EFDS can detect acceleration signals indicative of a decrease in drag on the side of the feathered engine.

In some implementations, the EFDS 106 can be configured to allow a user to customize the sequence of warning indications in response to an engine failure. For example, the EFDS 106 can be configured to interface with a user's mobile device or personal computer (e.g., through a BLE communication interface 214). A corresponding application on the user's mobile device or computer can be used to allow a user to load an emergency procedure into the EFDS 106 or customize their own indications. For example, the EFDS 106 can have various options for indicating engine failure including, but not limited, to selecting lighting sequences for the failed and operating engine warning indications, selecting types of indications (e.g., visible or audible), flashing a warning light indication at a frequency corresponding to the severity of the engine failure (e.g., a faster flashing frequency may indicate a more severe engine failure). In some implementations, the EFDS 106 can use the BLE communication interface 214 to push information to an application on a mobile device or personal computer. For example, the EFDS 106 can send raw or processed inertial data to a mobile device for display in graphic charts, EFDS status information (e.g., low battery alerts), EFDS diagnostic information for use in troubleshooting, etc.

Figures 3A, 3B:
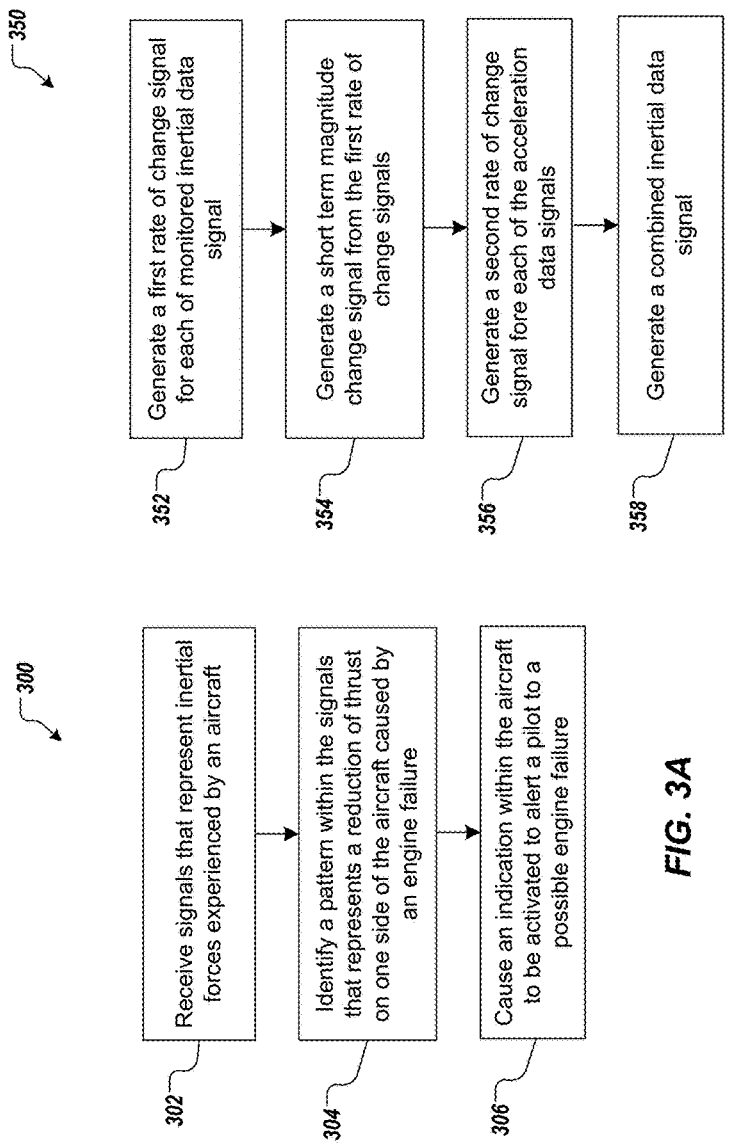
FIGS. 3A and 3B depict flowcharts of an example processes that can be executed in accordance with implementations of the present disclosure.

FIG. 3A is a flowchart illustrating an example process 300 that can be executed in accordance with implementations of the present disclosure. In some implementations, the example process 300 can be realized using one or more computer-executable programs that are executed using one or more computing devices (e.g., EFDS 106, as shown in FIGS. 1 and 2 and described above). In some implementations, the example process 300 can be used for detecting and alerting a pilot to an aircraft engine failure.

Figure 4A:
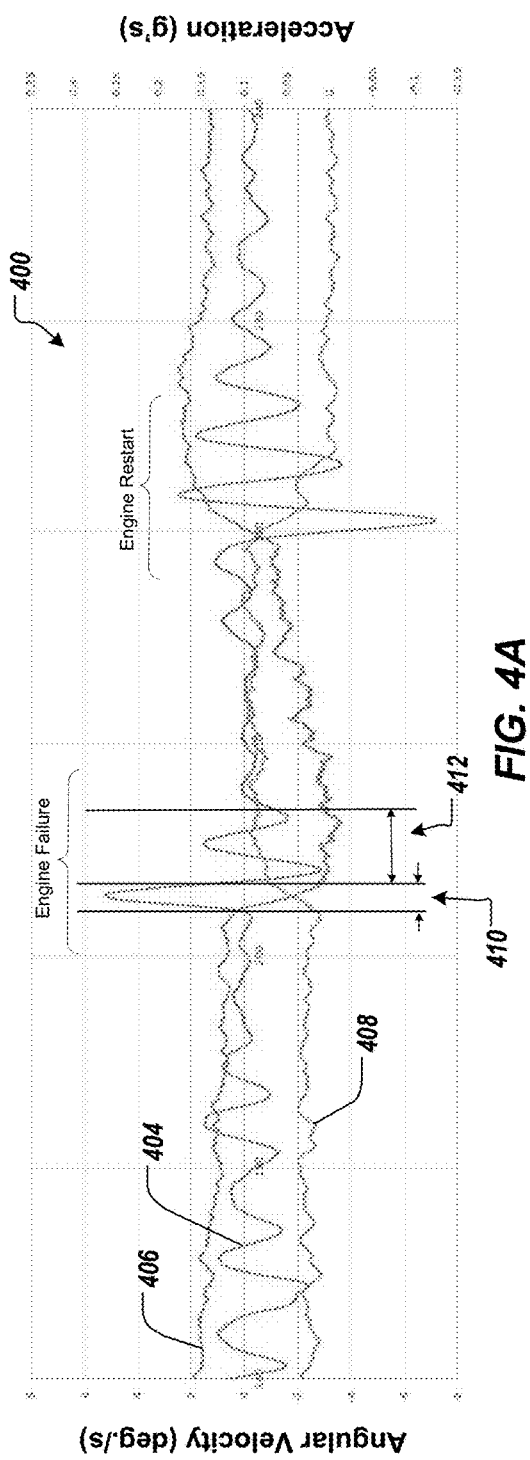
FIGS. 4A-4D depict exemplary data signals in accordance with implementations of the present disclosure.

Signals that represent inertial forces experienced by an aircraft are received 302. For example, data signals generated by an inertial sensor (e.g., inertial sensor 212 of FIG. 2) can be received by a processor of an EFDS. For example, FIG. 4A shows a plot 400 of several example raw data signals from an inertial sensor. Gyroscopic sensor data for rotation about a z-axis is represented by signal 404 and is indicated in degrees per second (deg./s) on the left axis of plot 400. Acceleration sensor data from an accelerometer oriented along the x-axis of an aircraft is represented by signal 406 and acceleration sensor data from an accelerometer oriented along the y-axis of an aircraft is represented by signal 408. The acceleration data is indicated in g-force (g's) or acceleration relative to the force of gravity on the right axis of plot 400. The plot 400 illustrates the pattern variations of the three signals 404, 406, 408 in response to both an engine failure and the subsequent restart of the same engine. For example, the plot 400 may represent a failure of the left-side engine as indicated by the positive increase in acceleration in the y-axis (the y-axis acceleration is in the same direction as the failed engine).

Referring again to FIG. 3A, a pattern is identified within the signals that represents a reduction of thrust on one side of the aircraft caused by an engine failure 304. For example, the EFDS can monitor for and detect patterns within one or more of the inertial data signals that indicate the potential failure of an engine. In some examples, the EFDS can detect a potential engine failure by identifying a pattern in a gyroscopic rotation signal about the aircraft's z-axis and a linear acceleration signal along the aircraft's y-axis. In some examples, the EFDS can detect a potential engine failure by identifying a pattern in the two above mentioned signals, and, in addition, in the deceleration signal along the aircraft's x-axis. In some examples, including the third signal, the deceleration along the x-axis, may reduce the instances of false positive detections. In other words, the EFDS can be configured to monitor either two or three inertial data signals to detect potential engine failures (e.g., the "monitored signals").

In some examples, the pattern that indicates a potential engine failure is identified by detecting magnitude changes in the monitored signals that occur over two time periods. During a first time period the magnitudes of all of the monitored signals will change rapidly. Then, during a second time period the change in magnitude of one signal or two of the signals will persist for the duration of a second time period. The second time period is longer than the first. For example, the first time period should be less than or equal to approximately 200 ms and the second time period should be between approximately 1 and 5 seconds.

For example, in an implementation in which only the z-axis rotation and the y-axis acceleration are monitored, a potential engine failure can be detected by identifying whether the magnitude change in both signals during the first time period increases above a threshold value, and whether the magnitude change of the y-axis acceleration persists for the duration of the second time period. If so, then a reduction of thrust indicative of a potential engine failure has been detected. Likewise, in an implementation in which the z-axis rotation, the y-axis acceleration, and x-axis deceleration are monitored, a potential engine failure can be detected by identifying whether the magnitude change in all three signals during the first time period increases above a threshold value, and whether the magnitude change of both the y-axis acceleration and x-axis deceleration persists for the duration of the second time period. In some examples, a separate threshold value may be set for each monitored signal. In some examples and as described in more detail below, the monitored signals can be combined and compared to one threshold value.

In some examples, the side of the aircraft on which the engine has failed can be identified based on the direction (e.g., positive or negative) of the magnitude change in one or more of the signals. For example, a negative magnitude change in the y-axis acceleration may indicate an engine failure on the right-side of the aircraft, while a positive magnitude change in the y-axis acceleration may indicate an engine failure on the left-side of the aircraft.

Referring again to FIG. 4A, the plot 400 depicts an example pattern of signals representing a reduction in thrust on the right-side of an aircraft. Specifically, during the first time period 410 all three inertial data signals 404, 406, and 408 increase in magnitude significantly above each signal's respective noise level. Such increases can be compared to respective threshold magnitude changes for each signal. The magnitude change in the x-axis acceleration signal 406 and the y-axis acceleration signal 408, then persist for the duration of the second time period 412. When an EFDS identifies such a pattern, the EFDS can alert a pilot to a potential engine failure.

Referring again to FIG. 3A, an indication within the aircraft is activated to alert a pilot to a possible engine failure (306). For example, the EFDS can send instruction signals to one or more warning indicators (e.g., warning indicators 204, 206 of FIG. 2) to activate visible or audible warning devices. For example, the EFDS can send signals to the warning indicators to cause a warning light to illuminate. In some examples, the warning indicator can indicate the side of the aircraft that the failed engine is on. For example, a red warning light on the control that controls the failed engine can be activated and a green warning light on the control that control the operating engine can be activated. In some examples, warning lights can be illuminated in a sequence that indicates an order of operating the aircraft's controls according to emergency procedures for a failed engine.

In some implementations, the EFDS can send appropriate instructions signals wirelessly (e.g., through a BLE network) to the warning indicators.

FIG. 3B is a flowchart illustrating an example process 350 that can be executed in accordance with implementations of the present disclosure. In some implementations, the example process 350 can be realized using one or more computer-executable programs that are executed using one or more computing devices (e.g., EFDS 106, as shown in FIGS. 1 and 2 and described above). In some implementations, the example process 350 can be used for combining inertial data signals to detect a reduction in thrust indicative of an engine failure.

A first rate of change signal is generated for each of the monitored inertial data signals (352). For example, the rate of change in magnitude can be determined for each of the monitored inertial data signals over a first time delay period. For example, the first rate of change in each signal can be represented by: $\Delta S_s(t) = s(t) - s(t-n)$, where $\Delta S_s(t)$ represents the first rate of change signal, s(t) represents the magnitude of an inertial data signal (e.g., the x-axis acceleration) at time t, and n is a fixed value that represents the first time delay period. The value of n may, for example, correspond to the first time period discussed above and can be a time delay less than or equal to approximately 200 ms (or a number of data samples that represent an equivalent delay period). In some implementations, each of the first rate of change signals can be determined by applying a high-pass or band-pass filter with an appropriate cutoff frequency to each of the inertial signals. For example, the cutoff frequency may correspond to the desired value of the first time period (n).

Figure 4B:
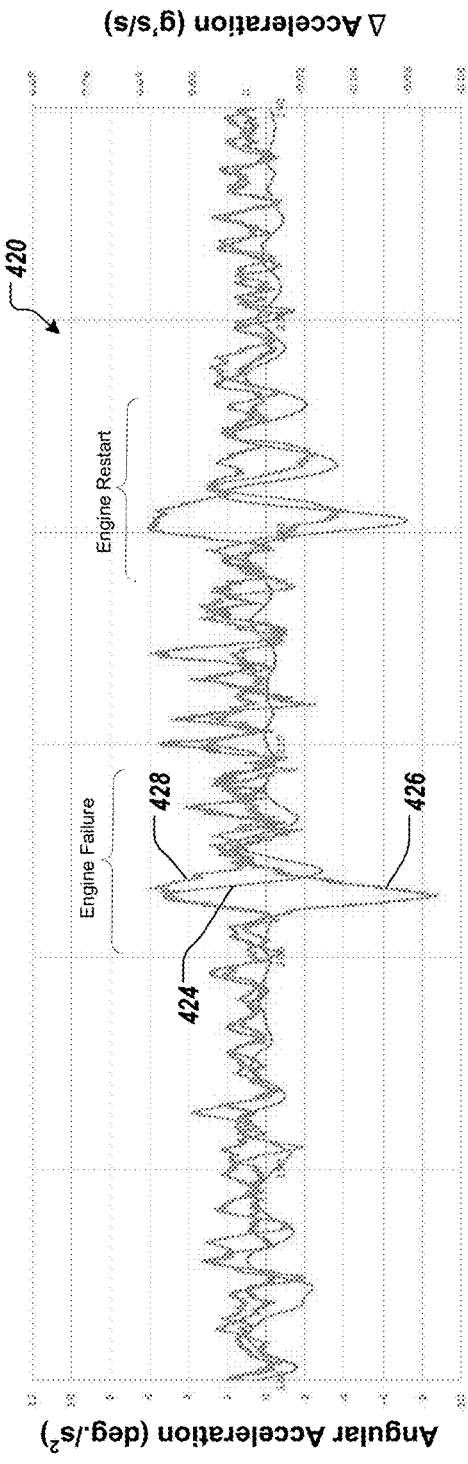

For example, FIG. 4B shows a plot 420 of the first rate of change signals calculated for each of the inertial data signals 404, 406, 408 of plot 400 in FIG. 4A. Signal 424 represents the first rate of change signal calculated for the signal 404 (the z-axis rotation signal) and is indicated in degrees per second squared (deg./s²) on the left axis. Signal 426 represents the first rate of change signal calculated for the signal 406 (the x-axis acceleration signal). Signal 428 represents the first rate of change signal calculated for the signal 408 (the y-axis acceleration signal). The acceleration data is indicated in g-force (g's/s) or acceleration relative to the force of gravity on the right axis of plot 420.

Referring again to FIG. 3B, a short term magnitude change signal is generated from the first rate of change signals (354). For example, each of the first rate of change signals are combined into a short term magnitude change signal. For example, the short term magnitude change signal represents the total magnitude change of the monitored inertial data signals during the first time period and corresponds with the magnitude change pattern shown during the first time period 410 in FIG. 4A. An example short term magnitude change signal 442 generated from signals 424, 426, and 428 is illustrated in plot 440 of FIG. 4C.

The short term magnitude change signal 342 can be generated by inverting the signals 424, 426, and 428 as appropriate to detect engine failures on either the right or left side of the aircraft. For example, the signals 424, 426, and 428 can be split into two data analysis channels; a first channel to analyze for engine failures on the right side of the aircraft and a second channel to analyze for engine failures on the left side of the aircraft. For example, as depicted in FIG. 4B, to detect the failure of a left side engine only the first rate of change signal for the x-axis acceleration data (signal 426) would be inverted. By contrast, for example, to detect the failure of a right side engine all of the first rate of change signals (signals 424, 426, and 428) would be inverted. The signals are inverted such that all of the magnitude changes of interest are greater than zero.

In some examples, after inverting the appropriate first rate of change signals, all of the first rate of changes signals (e.g., signals 424, 426, and 428) are shifted down by an offset value to remove the noise. For example, the offset value can be subtracted from the first rate of change signals (e.g., signals 424, 426, and 428). Any negative value portions of the first rate of change signals (e.g., signals 424, 426, and 428) are removed, for example, by setting the negative values to zero. The remaining signals are then combined into a single short term magnitude change signal 342, for example, by multiplying the remaining values of first rate of change signals (e.g., signals 424, 426, and 428).

Figure 4C:
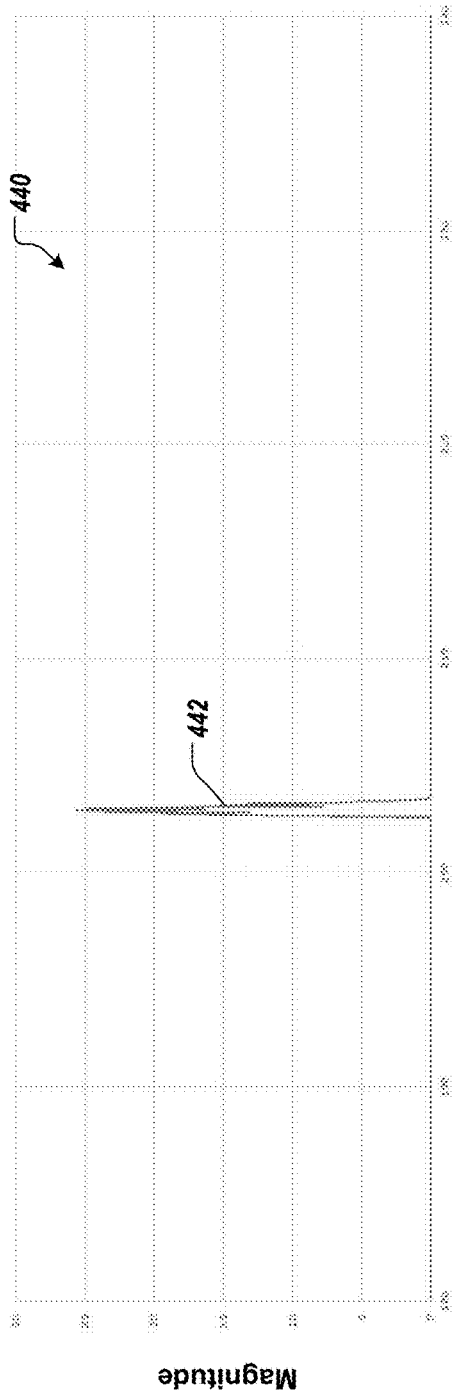

In some examples, the process of generating the short term magnitude change signal 342 by inverting appropriate signals and zeroing negative values may aid in reducing false positive detections. For example, as shown in FIG. 4C the process described results in the complete removal of the engine restart signal pattern (from FIG. 4A), because the x-axis signal, which is similar to the engine failure signal pattern, is opposite in polarity and would be completely removed.

Referring again to FIG. 3B, a second rate of change signal is generated for each of the acceleration (x-axis and y-axis) data signals (356). For example, the rate of change in magnitude can be determined for each of the monitored acceleration data signals using a second time delay period. For example, the first rate of change in each signal can be represented by: $\Delta S_L(t) = s(t) - s(t-m)$, where $\Delta S_L(t)$ represents the first rate of change signal, s(t) represents the magnitude of an inertial data signal (e.g., the x-axis acceleration) at time t, and m is a fixed value that represents the second time delay period. The value of m may correspond, for example, to the second time period discussed above and can represent a delay period between approximately 1 and 5 seconds (or a number of data samples that represent an equivalent delay period). In some implementations, each of the second rate of change signals can be determined by applying a high-pass or band-pass filter with an appropriate cutoff frequency to each of the acceleration data signals. For example, the cutoff frequency may correspond to the desired value of the second time period (m).

Figure 4D:
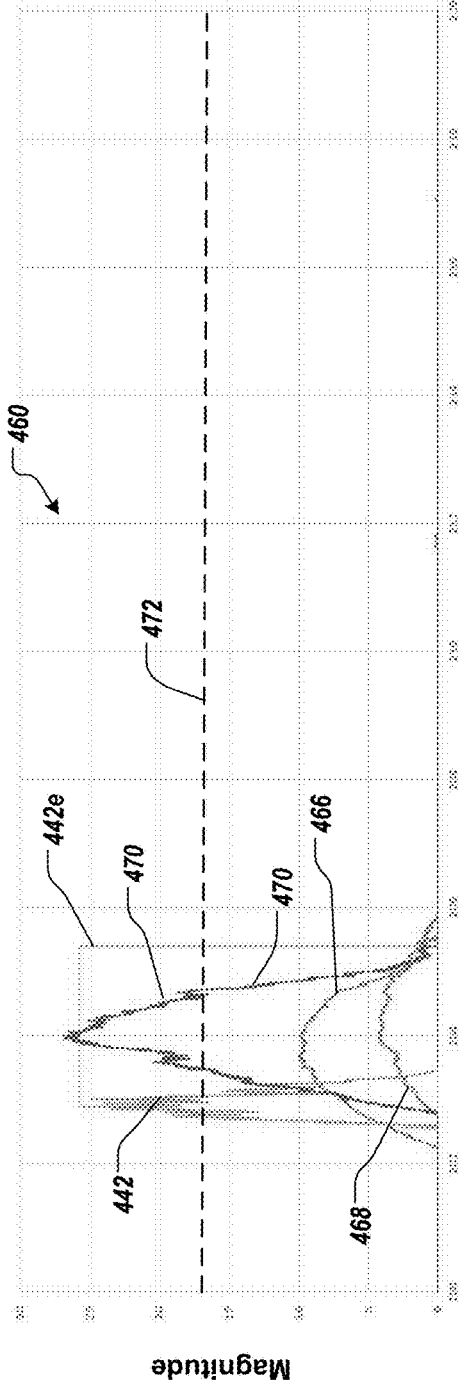

For example, FIG. 4D shows a plot 460 of the second rate of change signals calculated for each of the acceleration data signals 406 and 408 of plot 400 in FIG. 4A. Signal 466 represents the second rate of change signal calculated for the signal 406 (the x-axis acceleration signal). Signal 468 represents the second rate of change signal calculated for the signal 408 (the y-axis acceleration signal). In some examples, as noted above with respect to the first rate of change signals, the second rate of change signals can be inverted as appropriate for detecting engine failures on either the right or left side of the aircraft. For example, the second rate of change signal 466 for the x-axis acceleration has been inverted. The second rate of change signals correspond with the signal persistence pattern during the second time period 412, as described above and shown in FIG. 4A.

Referring again to FIG. 3B, the combined inertial data signal is generated from the short term magnitude change signal and the second rate of change signals 358. As shown in FIG. 4D, the short term magnitude change signal 442 is extended by a fixed time interval to generate the extended magnitude change signal 442e. For example, the peak magnitude value of the short term magnitude change signal 442 can be extended for a fixed time interval. The combined inertial data signal 470 is generated, for example, by multiplying the extended magnitude change signal 442e, the x-axis second rate of change signal 466, and the y-axis second rate of change signal 468. The combined inertial data signal 470 incorporates all of the elements of the reduction in thrust pattern discussed above with respect to FIG. 4A and can be compared to an engine failure threshold value 472 to identify a reduction in thrust that typically results from an engine failure.

In some implementations, an EFDS can incorporate a calibration mode for setting engine failure threshold value(s) and adapting the threshold value(s) to a particular aircraft. For example, a calibration input (e.g., a calibration button) that allows a user to initiate a calibration mode can be included in an EFDS. Once in the calibration mode, a user can simulate a failed engine, for example, by shutting down one engine. In the calibration mode, the EFDS can monitor for an inertial data signal pattern corresponding to a reduction in thrust due to a failed engine, but instead of activating a warning signal, the EFDS can analyze the signal to determine an appropriate threshold value for detecting such patterns. The EFDS can modify one or more threshold values and one or more time periods (or time delay periods) based on the detected pattern. In some examples, the EFDS can store multiple calibration patterns and determine appropriate threshold values and time period (or time delay period) values based on multiple calibration patterns. For example, the EFDS can use an average or weighted average of the multiple calibration patterns to determine appropriate threshold values and time period (or time delay period) values for a user's aircraft.

In some implementations, the processes 300 and 350 can be implemented as an application on a mobile computing device. For example, a mobile computing device can include, but is not limited to, a smartphone, tablet computer, laptop computer, etc.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example Linux, UNIX, Windows, Mac OS, Android, iOS or any other suitable conventional operating system A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

As used herein, the term "real-time" refers to transmitting or processing data without intentional delay given the processing limitations of a system, the time required to accurately obtain data and images, and the rate of change of the data and images. In some examples, "real-time" is used to describe concurrently processing a drone flight data as the drone executes a flight plan (e.g., while the drone is in-flight). Although there may be some actual delays, the delays are generally the data analysis results can be computed within sufficient time such that the results remain relevant to aspects of the drone's flight. For example, flight plan modifications calculated based on drone flight data are computed and transmitted to a drone before the drone's flight progress renders the modifications irrelevant.

Accordingly, the above description of example implementations does not define or constrain this disclosure. Other changes, substitutions, and alterations are also possible without departing from the spirit and scope of this disclosure.

What is claimed is:

1. A computer-implemented method for detecting aircraft engine failure in a multi-engine aircraft, the method executed by one or more processors and comprising:
   receiving, from an inertial sensor mounted in an aircraft, signals that represent inertial forces experienced by the aircraft, the signals including at least one signal that represents an acceleration of the aircraft and at least one signal that represents a rotation of the aircraft;
   identifying, by the one or more processors, a pattern, within the signals, that represents a reduction of thrust on one side of the aircraft caused by an engine failure; and
   in response to identifying the pattern, causing an indication within the aircraft to be activated, and thereby, alerting a pilot to a possible engine failure.

2. The method of claim 1, wherein the inertial sensor is a 6-axis inertial sensor, and wherein the signals comprise three linear acceleration signals, each being along a different orthogonal axis, and three angular acceleration signals, each being about a different orthogonal axis.

3. The method of claim 1, wherein the pattern comprises:
   a change in magnitude for three of the signals that occurs, for each of the three signals, within a first time period, and
   a persistence in the magnitude change of two of the three signals for a duration of a second time period, after the first time period.

4. The method of claim 3, wherein the change in magnitude for each of the three signals is greater than or equal to a, respective, threshold value.

5. The method of claim 3, wherein the first time period is less than or equal to 200 ms.

6. The method of claim 3, wherein the second time period is between 1 second and 5 seconds.

7. The method of claim 3, wherein the persistence in the magnitude change of the two of the three signals is indicated by the respective magnitudes of the two signals remaining above a, respective, threshold value for the duration of the second time frame.

8. The method of claim 1, wherein identifying the pattern comprises:
   combining three of the signals into a combined signal; and determining whether the combined signal exceeds a threshold value.

9. The method of claim 1, further comprising determining, based on the signals, on which side of the aircraft the reduction of thrust occurred,
wherein causing an indication within the aircraft to be activated comprises causing a first indication to be activated based on determining that the reduction in thrust occurred on the port side, and causing a second indication to be activated based on determining the reduction in thrust occurred on the starboard side.

10. The method of claim 1, further comprising:
determining, from the signals, an average gravitational acceleration signal;
determining, based on the average gravitational acceleration signal, an offset between a position of a z-axis of the aircraft relative to a z-axis of the inertial sensor; and
modifying the signals, based on the position of the z-axis of the aircraft relative to the z-axis of the inertial sensor, to account for the offset.

11. The method of claim 1, further comprising:
receiving a user input to enter a calibration mode; and
in response to identifying the pattern, modifying one or more threshold values and one or more time periods based on the pattern.

12. An engine failure detection system for multi-engine aircraft comprising:
one or more processors;
a data store coupled to the one or more processors having instructions stored thereon for execution by the one or more processors;
an inertial sensor coupled to the one or more processors and configured to be mounted to an aircraft;
a first warning light coupled to the one or more processors; and
a second warning light coupled to the one or more processors,
wherein the instructions, when executed by the one or more processors, causes the one or more processors to perform operations comprising:
receiving, from the inertial sensor, signals that represent inertial forces experienced by the aircraft, the signals including at least one signal that represents an acceleration of the aircraft and at least one signal that represents a rotation of the aircraft;
identifying a pattern, within the signals, that represents a reduction of thrust on one side of the aircraft caused by an engine failure; and
in response to identifying the pattern, causing one of the first or second warning light to be activated, and thereby, alert a pilot to a possible engine failure.

13. The system of claim 12, wherein the system is a stand-alone system that is not integrated with other sensor or systems of the aircraft.

14. The system of claim 12, further comprising a wireless communication interface, and
wherein the first warning light and the second warning light are each coupled to a wireless receiver; and
wherein causing one of the first or second warning light to be activated comprises sending, by the wireless communication interface to the wireless receiver of the one of the first or second warning light, a command to activate the one of the first or second warning light.

15. The system of claim 12, wherein the inertial sensor is a 6-axis inertial sensor, and wherein the signals comprise three linear acceleration signals, each being along a different orthogonal axis, and three angular acceleration signals, each being about a different orthogonal axis.

16. The system of claim 12, wherein the pattern comprises:
a change in magnitude for three of the signals that occurs, for each of the three signals, within a first time period, and
a persistence in the magnitude change of two of the three signals for a duration of a second time period, after the first time period.

17. The system of claim 16, wherein the change in magnitude for each of the three signals is greater than or equal to a, respective, threshold value.

18. The system of claim 16, wherein the first time period is less than or equal to 200 ms.

19. The system of claim 16, wherein the second time period is between 1 second and 5 seconds.

20. The system of claim 16, wherein the persistence in the magnitude change of the two of the three signals is indicated by the respective magnitudes of the two signals remaining above a, respective, threshold value for the duration of the second time frame.

21. The system of claim 12, wherein identifying the pattern comprises:
combining three of the signals into a combined signal; and
determining whether the combined signal exceeds a threshold value.

22. The system of claim 12, wherein the operations comprise determining, based on the signals, on which side of the aircraft the reduction of thrust occurred,
wherein causing an indication within the aircraft to be activated comprises causing a first indication to be activated based on determining that the reduction in thrust occurred on the port side, and causing a second indication to be activate based on determining the reduction in thrust occurred on the starboard side.

23. The system of claim 12, wherein the operations comprise:
determining, from the signals, an average gravitational acceleration signal;
determining, based on the average gravitational acceleration signal, an offset between a position of a z-axis of the aircraft relative to a z-axis of the inertial sensor; and
modifying the signals, based on the position of the z-axis of the aircraft relative to the z-axis of the inertial sensor, to account for the offset.

24. The system of claim 12, wherein the operations comprise:
receiving a user input to enter a calibration mode; and
in response to identifying the pattern, modifying one or more threshold values and one or more time periods based on the pattern.

25. A non-transitory computer readable storage device storing instructions that, when executed by one or more processors, cause the one or more processors to perform operations comprising:
receiving, from an inertial sensor mounted in a multi-engine aircraft, signals that represent inertial forces experienced by the aircraft, the signals including at least one signal that represents an acceleration of the aircraft and at least one signal that represents a rotation of the aircraft;
identifying, by the one or more processors, a pattern, within the signals, that represents a reduction of thrust on one side of the aircraft caused by an engine failure; and in response to identifying the pattern, causing an indication within the aircraft to be activated, and thereby, alerting a pilot to a possible engine failure.

\* \* \* \* \*

UNITED STATES PATENT AND TRADEMARK OFFICE
CERTIFICATE OF CORRECTION

PATENT NO. : 9,697,655 B1
APPLICATION NO. : 15/071455
DATED : July 4, 2017
INVENTOR(S) : Christopher Eyhorn et al.

Page 1 of 1

It is certified that error appears in the above-identified patent and that said Letters Patent is hereby corrected as shown below:

In the Claims

In Claim 22, Column 16, Line 36, delete "activate" and insert -- activated --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*